United States Patent
Kashiwazaki et al.

(10) Patent No.: US 6,203,604 B1
(45) Date of Patent: Mar. 20, 2001

(54) INK, COLOR FILTER, LIQUID CRYSTAL PANEL, AND COMPUTER, AND PROCESS FOR PRODUCING COLOR FILTER

(75) Inventors: Akio Kashiwazaki, Yokohama; Katsuhiro Shirota, Kawasaki; Koichiro Nakazawa; Masashi Hirose, both of Tokyo; Mayumi Yokoyama, Yokohama; Yoshihisa Yamashita, Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/276,611

(22) Filed: Mar. 25, 1999

(30) Foreign Application Priority Data

Mar. 31, 1998 (JP) .................................. 10-086226

(51) Int. Cl.$^7$ .................................. C09D 11/02
(52) U.S. Cl. .................. 106/31.5; 106/31.27; 106/31.43
(58) Field of Search ............................ 106/31.27, 31.43, 106/31.5

(56) References Cited

U.S. PATENT DOCUMENTS

| | | | |
|---|---|---|---|
| 4,554,555 | * 11/1985 | Aruga et al. | 106/31.5 |
| 4,804,411 | 2/1989 | Eida et al. | 106/31.51 |
| 4,864,324 | 9/1989 | Shirota et al. | 346/1.1 |
| 5,074,914 | 12/1991 | Shirota et al. | 106/31.51 |
| 5,110,356 | 5/1992 | Shirota et al. | 106/31.52 |
| 5,123,960 | 6/1992 | Shirota et al. | 106/31.47 |
| 5,135,570 | 8/1992 | Eida et al. | 106/31.52 |
| 5,135,571 | 8/1992 | Shirota et al. | 106/31.51 |
| 5,139,573 | 8/1992 | Yamamoto et al. | 106/31.52 |
| 5,216,437 | 6/1993 | Yamamoto et al. | 346/1.1 |
| 5,231,417 | 7/1993 | Shirota et al. | 346/1.1 |
| 5,593,757 | 1/1997 | Kashiwazaki et al. | 428/195 |
| 5,811,209 | * 9/1998 | Eida et al. | 430/7 |
| 5,958,118 | * 9/1999 | Evans et al. | 106/31.5 |

FOREIGN PATENT DOCUMENTS

| | | |
|---|---|---|
| 634 457 | 1/1995 | (EP) . |
| 703 471 | 3/1996 | (EP) . |
| 59-75205 | 4/1984 | (JP) . |
| 63-235901 | 9/1988 | (JP) . |
| 1-217302 | 8/1989 | (JP) . |
| 4-123005 | 4/1992 | (JP) . |
| 7-242651 | 9/1995 | (JP) . |
| 8-327811 | 12/1996 | (JP) . |
| 10-288708 | * 10/1998 | (JP) . |

* cited by examiner

Primary Examiner—Helene Klemanski
(74) Attorney, Agent, or Firm—Fitzpatrick, Cella, Harper & Scinto

(57) ABSTRACT

A novel ink is provided which comprises a metal complex azopyrazolone dye and a xanthene dye. This ink is suitable for forming a color filter by an ink-jet system. A color filter, a liquid crystal panel, and a computer employing the ink are also provided. Further, a process for producing the color filter is provided.

32 Claims, 6 Drawing Sheets

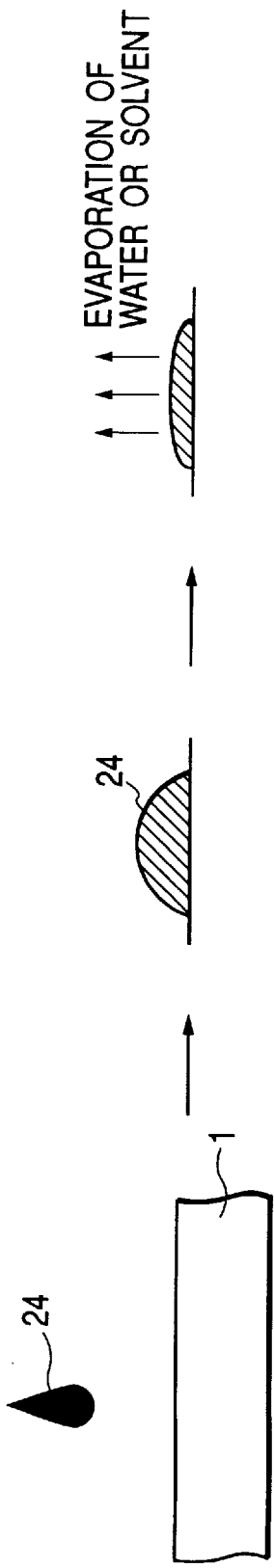
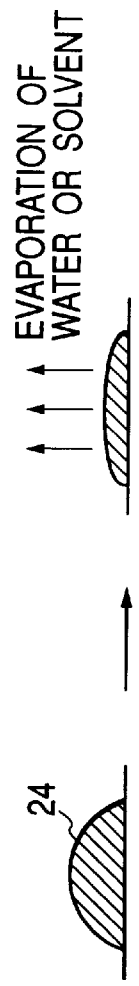
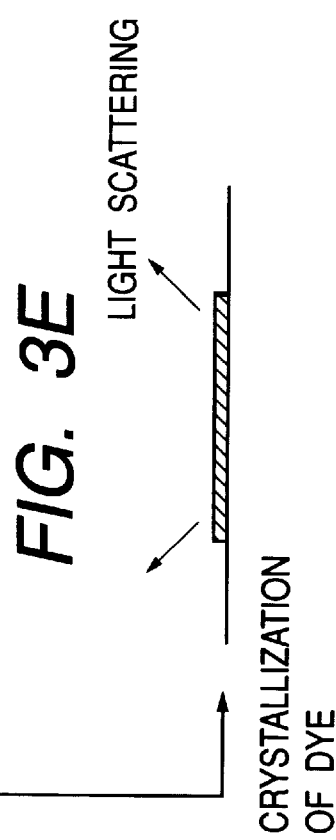

INK, COLOR FILTER, LIQUID CRYSTAL PANEL, AND COMPUTER, AND PROCESS FOR PRODUCING COLOR FILTER

BACKGROUND OF THE INVENTION

1. Field of the Invention

The present invention relates to an ink for ink-jet recording, a color filter of a liquid crystal color display device used in color televisions, personal computers and the like, a process for producing the color filter, and a liquid crystal panel employing the color filter.

2. Related Background Art

A color filter is one of the important parts of a liquid crystal color display device. This filter is so constituted that many pixels of three primary colors of red (R), green (G) and blue (B) are arranged repeatedly. With development of personal computers, especially portable personal computers, liquid crystal display devices, in particular liquid crystal color display devices, are increasingly in demand. For further popularization thereof, it is demanded that a cost of the liquid crystal display device, especially the relatively high cost of the color filter, should be reduced. For reducing the cost of the color filter with the required quality retained, various color filter production processes have been investigated. Typical production processes of color filters are explained below.

A first process employed most widely is a dyeing process. In this process, a water-soluble polymer for dyeing is sensitized by addition of a photosensitive material, the sensitized polymer is patterned by photolithography in a desired shape on a transparent base plate, and the obtained pattern is dyed in a dyeing bath to obtain a colored pattern. This operation is repeated three times to produce an RGB color filter.

A second process employed relatively widely is a pigment dispersion process. This process is replacing the above dyeing process. In this process, a photosensitive resin layer containing a pigment dispersed therein is formed on a base plate, and the resin layer is patterned to obtain a pattern for one color. This operation is repeated three times to form an RGB color filter.

A third process is an electrodeposition process. In this process, a transparent electrode is patterned on a base plate, and the patterned base plate is immersed in a electrodeposition solution containing a pigment, a resin, an electrolyte and so forth to deposit a first color. This operation is repeated three times to form RGB color layers and then the colored layers are calcined, thereby forming a color filter.

A fourth process is a printing process. In this process, paints containing a pigment and a thermosetting resin are applied onto a base plate for each of the three colors of R, G and B, and the colored resin layer is cured by heating to form an RGB color filter.

The above processes, however, have many unsolved problems, as described below. For example, in any of the above processes, a protection layer is generally formed on the colored layer. And what is common to these processes is that it is necessary to repeat the same operation three times for formation of R, G and B, which inevitably increases the production cost. The larger the number of steps, the lower the yield, disadvantageously. Further, the third process is not applicable to a TFT color display device owing to the limited formable pattern with the present technical level. The fourth process has the drawbacks of low resolution and poor smoothness, and thus is not suitable for fine-pitch pattern.

To offset these disadvantages, ink-jet systems are proposed for producing a color filter (see Japanese Patent Application Laid-Open Nos. 59-75205, 63-235901, 1-217302, 4-123005, etc.). In these systems, coloring liquids (hereinafter referred to as an "ink") containing respectively a dyestuff of red (R), green (G) or blue (B) are ejected through a nozzle onto a filter base plate, and the deposited inks are dried to form pixels, thereby forming a color filter. By this system, the colored layers of R, G and B can be formed in one step, and the inks can be deposited selectively on pixel formation portions without waste of inks, so that productivity can be improved and production cost can be reduced.

The ink for color filter production by the ink-jet system desirably satisfies at a higher level the requirements for the characteristics shown below:

(a) high transparency of the pixels (colored portions) of the color filter, (b) less areal spreading of the pixels with lapse of time (hereinafter referred to as "bleeding"), (c) high adhesiveness of the pixels, (d) high light-fastness of the pixels of the color filter, and (e) high ejection stability in ink-jet recording system.

The production of a color filter by an ink-jet system is greatly different from conventional color filter production processes, for example as shown in FIGS. 3A to 3E, in that an ink 24 containing a dye in a high concentration is applied selectively onto pixel portions on a base plate 1 (FIG. 3A) and a solvent or the dispersing medium (water, an organic solvent, etc.) is evaporated to form pixels (FIG. 3C). FIG. 3B shows a state where the ink 24 is just applied and FIG. 3D shows a state where a pixel is normally formed. However, as shown in FIG. 3E, it has been found by the inventors of the present invention that the dyestuff may crystallize out from the ink 24 applied on the base plate during drying to lower the transparency of the formed pixels, or may cause bleeding of the pixels by migration of the pixel-forming dye with lapse of time owing to incomplete evaporation of the solvent. The remaining residual solvent in the pixels may lower the adhesiveness to the base plate by an interaction with the base plate, or may impair light-fastness owing to influence of active oxygen formed by thermal decomposition. Therefore, it is preferable that the ink for color filter formation preferably should satisfy the above requirements (a) to (d) at a high level. Further, it is needless to say that the ink for an ink-jet system should be ejected stably. The inventors of the present invention have investigated inks having the above characteristics. Consequently, it has been found that an ink comprising a metal complex azopyrazolone dye and a dye having a xanthene-skeleton satisfies the requirements for characteristics (a) to (e) mentioned above at a higher level as an ink-jet ink for formation of a red pixel in a color filter.

SUMMARY OF THE INVENTION

The present invention has been accomplished on the basis of the above findings.

An object of the present invention is to provide an ink satisfying the above characteristics (a) to (e) at a higher level.

Another object of the present invention is to provide a color filter having red color filter portions having high transparency, causing very little bleeding, and having excellent adhesiveness.

Still another object of the present invention is to provide a process for producing a color filter which has red filter portions having high transparency, causing less bleeding, and having high adhesiveness, at a low production cost.

A further object of the present invention is to provide a liquid crystal panel of high quality.

A still further object of the present invention is to provide a computer having an image display device of high quality.

A still further object of the present invention is to provide a process for producing a color filter which has highly transparent red filter portions, causing less bleeding, and having high adhesiveness.

The above objects can be achieved by the present invention described below.

According to a first aspect of the present invention, there is provided an ink comprising a metal complex azopyrazolone dye and a xanthene dye (a dye having a xanthene skeleton).

According to another aspect of the present invention, there is further provided a color filter comprising a light transmissive base plate and a red color pixel at prescribed positions on the base plate, wherein the colored pixel comprises a metal complex azopyrazolone dye and a xanthene dye.

According to still another aspect of the present invention, there is still further provided a liquid crystal panel comprising a color filter and a panel base plate, in which the color filter has a light transmissive base plate, and a red color pixel is placed at a prescribed position on the base plate, the pixel containing a metal complex azopyrazolone dye and a xanthene dye, the panel base plate is placed in opposition to the color filter; and a liquid crystal compound is enclosed between the color filter and the panel base plate.

According to further another aspect of the present invention, there is further still provided a computer comprising a liquid crystal panel as an image display device which has a color filter, an opposing panel base plate and a liquid crystal compound enclosed therebetween, in which the color filter has a light transmissive base plate, and a red color pixel placed at a prescribed position on the base plate, the pixel containing a metal complex azopyrazolone dye and a xanthene dye.

According to another aspect of the present invention, there is also provided a process comprising the step of ejecting a recording ink containing a metal complex azopyrazolone dye and a xanthene dye onto a light-transmissive base plate by an ink-jet system to deposit the ink on prescribed positions to form color pixels there.

According to a further aspect of the present invention, there is also still provided a process comprising the steps of ejecting an ink for ink-jet recording containing a metal complex azopyrazolone dye, a xanthene dye and a curable resin onto a light-transmissive base plate by an ink-jet system to deposit the ink on a prescribed position; and curing the curable resin in the ink to form a color pixel there.

BRIEF DESCRIPTION OF THE DRAWINGS

FIGS. 3A, 3B, 3C, 3D and 3E illustrate a transient state during formation of a pixel of a color filter by an ink-jet system.

DESCRIPTION OF THE PREFERRED EMBODIMENTS

Figure 1A:
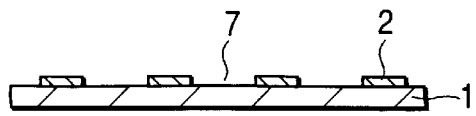
FIGS. 1A, 1B, 1C, 1D and 1E illustrate a flow chart of the process for producing a color filter of an embodiment of the present invention.

[First Embodiment]
(Ink for ink-jet recording)

The ink for the ink-jet recording in this embodiment of the present invention contains a metal complex azopyrazolone dye and a xanthene dye as coloring materials. This ink is suitably used as an ink for formation of red pixels of a color filter. (Metal complex azopyrazolone dye)

Examples of a metal complex azopyrazolone dye include dyes represented by the structural formula (I):

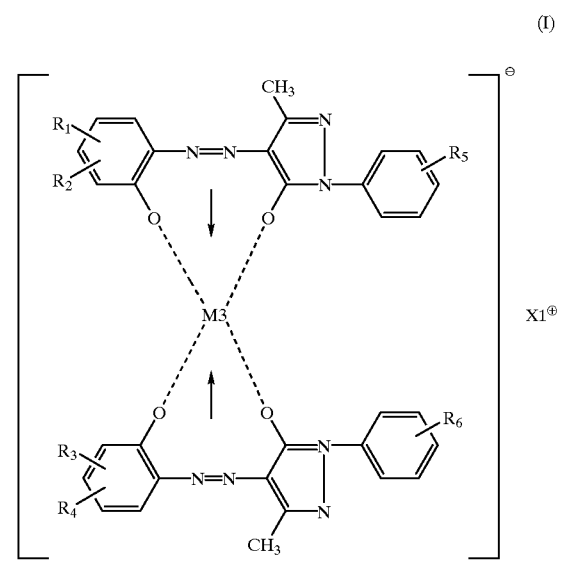

wherein $R_1$, $R_2$, $R_3$ and $R_4$ are each independently a hydrogen atom, a halogen atom such as fluorine, chlorine and bromine, a nitro group, a linear or branched alkyl group having 1 to 5 carbon atoms, a $CF_3$ group or an $SO_3(M1)$ group, where M1 is an alkali metal or $NH_4$; $R_5$ and $R_6$ are each independently a hydrogen atom, a halogen atom or an $SO_3(M2)$ group, where M2 is an alkali metal or $NH_4$; M3 is Cr, Ni or Co; and $X1^+$ is an alkali metal cation or $NH_4^+$, or by the structural formula (II):

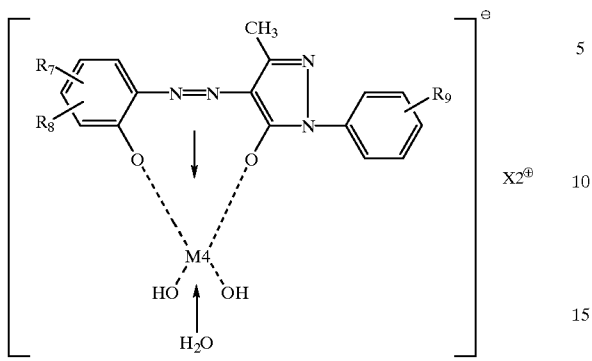

(II)

wherein $R_7$ and $R_8$ are each independently a hydrogen atom, a halogen atom such as fluorine, chlorine and bromine, a nitro group, a linear or branched alkyl group having 1 to 5 carbon atoms, a $CF_3$ group or an $SO_3(M1)$ group, where M1 is an alkali metal or $NH_4$; $R_9$ is a hydrogen atom, a halogen atom or an $SO_3(M2)$ group, where M2 is an alkali metal or $NH_4$; M4 is Cu or Cr; $X2^+$ is an alkali metal cation or $NH_4^+$; and examples of an alkali metal of M1, M2 and $X2^+$ include specifically Na, K and Li.

(Xanthene dye)

The xanthene dye in the present invention means a dye having the xanthene structure shown by the general formula (V) below in the molecule:

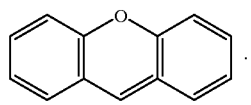

(V)

Specific examples include a dye of the general formula (III):

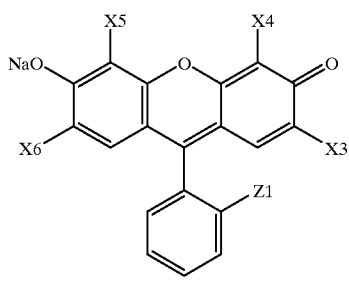

(III)

wherein $X_3$, $X_4$, $X_5$ and $X_6$ are each independently a halogen atom such as fluorine, chlorine, bromine and iodine; and Z1 is a —COO(M5) group or an —$SO_3^-$ group, where M5 is an alkali metal cation or $NH_4$, or of the general formula (IV):

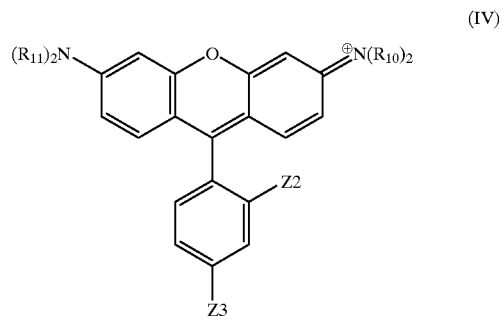

(IV)

wherein $R_{10}$ and $R_{11}$ are each independently a hydrogen atom, a linear or branched alkyl group having 1 to 5 carbon atoms, a substituted or unsubstituted aryl group; and Z2 and Z3 are each independently a —COO(M6) group or an —$SO_3^-$ group where M6 is an alkali metal such as Na, K and Li or $NH_4^+$.

More specifically, the xanthene dyes represented by the general formulae (III) and (IV) are exemplified as follows.

C.I. Acid Red 289

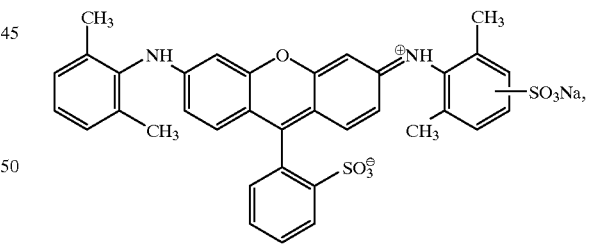

(VI)

C.I. Acid Red 52 (VII)
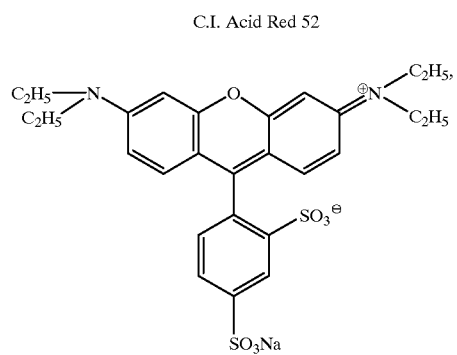
C.I. Acid Red 91 (XI)
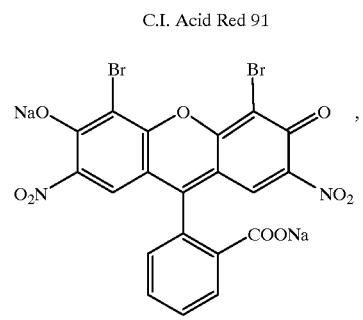
C.I. Acid Red 50 (VIII)
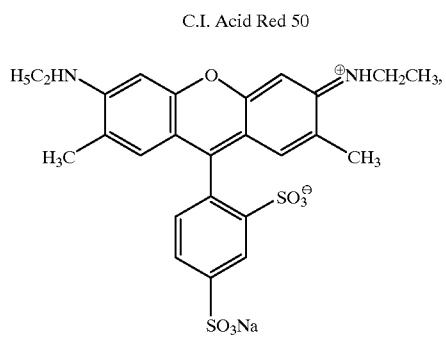
C.I. Acid Red 92 (XII)
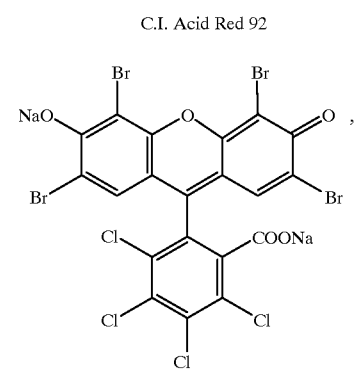
C.I. Acid Red 51 (IX)
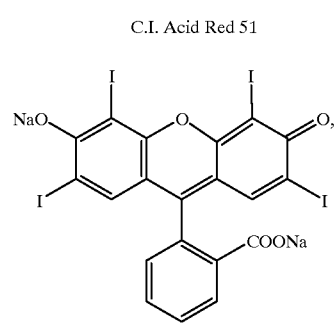
C.I. Acid Red 93 (XIII)
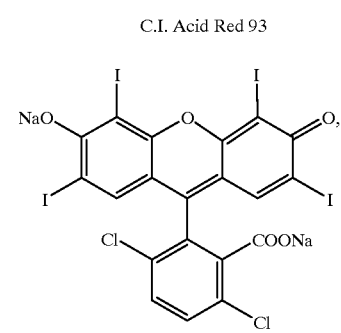
C.I. Acid Red 87 (X)
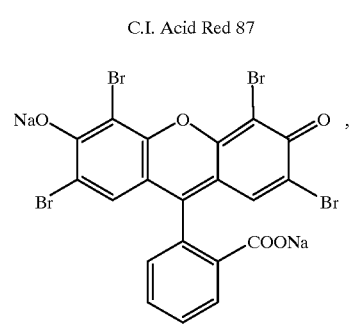
C.I. Acid Red 94 (XIV)
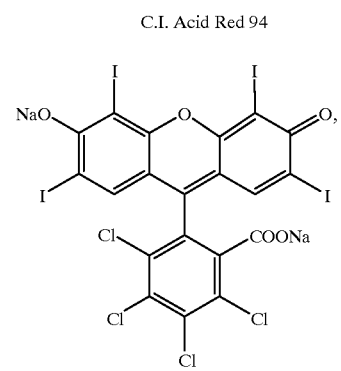

C.I. Acid Red 95

(XV)

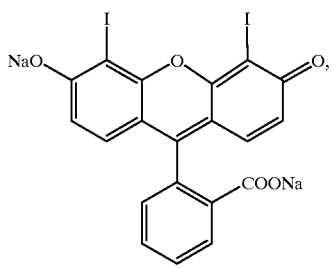

C.I. Acid Red 98

(XVI)

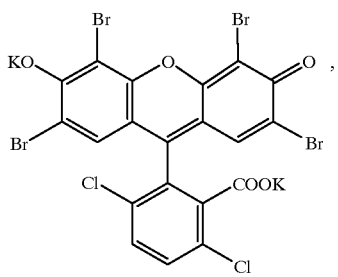

C.I. Acid Violet 9

(XVII)

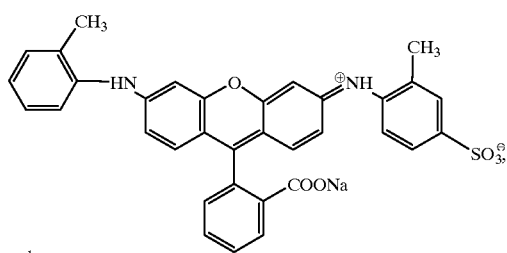

and

C.I. Acid Violet 30

(XVIII)

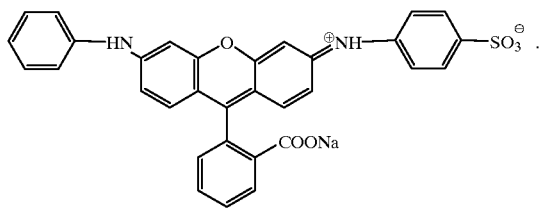

Besides, C.I. Acid Red 306 and C.I. Acid Violet 102 are also useful.

In this embodiment, especially preferable are combinations of a metal complex azopyrazolone dye of the general formula (I) above, in which at least one of $R_1$ and $R_2$ is an $SO_3(M1)$ group and both $R_3$ and $R_4$ are an $SO_3(M1)$ group, and a sulforhodamine represented by the general formula (IV) above, in which Z2 is a sulfo group ($-SO_3^-$) (e.g., C.I. Acid Red 289, C.I. Acid Red 52 and C.I. Acid Red 50).

These combinations provide inks which are excellent in the above characteristics (a) to (e).

A weight ratio of the metal complex azopyrazolone dye to the xanthene dye in the ink ranges preferably from 50:1 to 1:2, more preferably from 20:1 to 1:1, still more preferably from 10:1 to 2:1 for obtaining red pixels having excellent optical properties.

The total amount of the metal complex azopyrazolone dye and the xanthene dye in the ink ranges preferably from 0.1 to 15% by weight, more preferably from 1 to 10% by weight, still more preferably from 2 to 8% by weight. In this range, desirable optical properties of the pixels can be obtained and the characteristics of the ink can be kept suitable for precise ejection by ink-jet recording.

Aqueous media including water can be used for a medium constituting the ink, which keeps coloring matters in a dissolved state, a dispersed state or a dissolved and dispersed state. The content of water as a component in the aqueous medium ranges preferably from 10 to 90% by weight, more preferably from 20 to 80% by weight based on the total weight of the ink.

The aqueous medium may contain a water-soluble organic solvent. The solubility of components in the ink can be improved, and the viscosity of the ink can be adjusted by the use of a water-soluble organic solvent shown below. In particular, a water-soluble organic solvent having a boiling point ranging from about 150° C. to about 250° C. is suitably used since the possibility of occurrence of clogging of orifices can be decreased in ejecting the ink to deposit it on a base plate by an ink-jet recording system and also the adhesiveness to the base plate is not lowered. Table 1 shows examples of the useful water-soluble organic solvent.

TABLE 1

| Solvent | Boiling point (° C.) |
|---|---|
| N,N-Dimethyl formamide | 153 |
| 1-Methylcyclohexanol | 155 |
| 3-Heptanol | 156.2 |
| 2-Ethoxyethyl acetate | 156.3 |
| 1-Hexanol | 157.1 |
| 2-Heptanol | 160.4 |
| Cyclohexanol | 161 |
| 2-Furfurylaldehyde | 161.8 |
| N,N-Diethylethanolamine | 162.1 |
| 2-Methylcyclohexanol | 165 |
| Abietinol | 165 |
| N,N-Dimethylacetamide | 166.1 |
| 2-(Methoxymethoxy)ethanol | 167.5 |
| Diacetone alcohol | 168.1 |
| Furfuryl alcohol | 170 |
| Ethylene glycol monobutyl ether | 170.2 |
| Monoethanolamine | 171 |
| 3-Methylcyclohexanol | 173 |
| 4-Methylcyclohexanol | 173 |
| 1-Heptanol | 176.3 |
| N,N-Diethylformamide | 177 |
| Tetrahydrofurfuryl alcohol | 178 |
| 2-Octanol | 178 |
| N-Methylformamide | 180 |
| Ethylene glycol monoisoamyl ether | 181 |
| 2,3-Butanediol | 182 |
| Ethylene glycol monoacetate | 182 |
| Glycerin monoacetate | 182 |
| 2-Ethyl-1-hexanol | 184.7 |
| 1,2-Propanediol | 187.3 |
| Dipropylene glycol monomethyl ether | 190 |
| Ethylene glycol diacetate | 190.2 |
| 1,2-Butanediol | 190.5 |
| Ethylene glycol monobutyl ether acetate | 191.5 |
| 3,5,5-Trimethyl-1-hexanol | 194 |
| Diethylene glycol monomethyl ether | 194.1 |

TABLE 1-continued

| Solvent | Boiling point (° C.) |
|---|---|
| 1-Octanol | 195 |
| 2-Methyl-2,4-pentanediol | 197.1 |
| Dipropylene glycol monomethyl ether | 197.8 |
| Ethylene glycol | 197.9 |
| N-Methylpyrrolidone | 202 |
| Diethylene glycol monoethyl ether | 202 |
| γ-Butyrolactone | 204 |
| Benzyl alcohol | 205.5 |
| N-Methylacetamide | 206 |
| 1,3-Butanediol | 207.5 |
| Ethylene glycol monohexyl ether | 208.5 |
| Formamide | 210.5 |
| 1,3-propanediol | 214 |
| 1-Nonanol | 214 |
| Diethylene glycol monoethyl ether acetate | 214.7 |
| α-Terpineol | 219 |
| Acetamide | 221.2 |
| 1,4-Butanediol | 229.2 |
| Diethylene glycol monobutyl ether | 230.4 |
| 1-Decanol | 231 |
| Dipropylene glycol | 231.8 |
| 2-Butene-1,4-diol | 235 |
| Ethylene carbonate | 238 |
| Propylene carbonate | 242 |
| 1,5-Pentanediol | 242.4 |
| 1-Undecanol | 243 |
| Tripropylene glycol monomethyl ether | 243 |
| 2-Ethyl-1,3-hexanediol | 243.2 |
| Ethylene glycol monophenyl ether | 244.7 |
| Diethylene glycol | 244.8 |
| 2-Pyrrolidone | 245 |
| Diethylene glycol monobutyl ether acetate | 246.8 |
| Triethylene glycol monomethyl ether | 249 |

The ink may contain a surfactant of a nonionic, anionic or cationic type. The ink may contain other additives such as a pH-controlling agent, a mildewproofing agent and the like, as needed.

Such a type of ink is suitably used for formation of a red pixel in which the ink is ejected through a recording head by an ink-jet system, such as a bubble jet type employing an electrothermal transducer as the energy-generating element or a piezo jet type employing a piezo element, to be deposited on a color filter base plate. The ink ejection property can be made excellent in particular when, at the time of ejection, the ink has a surface tension ranging from 30 to 68 dyn/cm and an ink viscosity not higher than 15 cP, preferably not higher than 10 cP, more preferably not higher than 5 cP, at 25° C. Specific ink compositions for achieving the desirable properties in this embodiment are shown later in the Examples.

(Production of Color Filter)

The process for producing a color filter employing the aforementioned ink is described below.

FIGS. 1A to 1E illustrate a process for producing a color filter of an embodiment of the present invention.

FIG. 1A shows a base plate 1 on which a light-shielding portion 2 (hereinafter referred to as a "black matrix") is formed in the form of a pattern. In a case of forming the black matrix 2 on a base plate directly, there may be exemplified, for example, a process in which a thin film of a metal (e.g., chromium, and chromium oxide) is formed by sputtering or vapor deposition and subsequently patterning it by photolithography, or in a case of forming it on a resin composition, a process of patterning by a usual photolithography is exemplified. Reference numeral 7 denotes a portion through which light can pass.

Figure 1B:
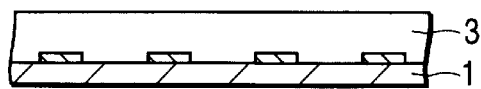

A layer in which a curable resin composition is contained is formed on the base plate 1 having black matrix 2 formed thereon, thereby providing an ink-receiving layer 3 (FIG. 1B). The base plate employed is usually made of glass. However, any material other than glass may be used, so far as characteristics such as light transmittance and mechanical strength required commonly for the liquid crystal color filter can be satisfied. For example, a transparent acrylic resin can be used as the base plate.

An ink-receiving layer 3 may be formed from a conventional material. In consideration of heat resistance, acrylic resins, epoxy resins and imide resins are suitable. In consideration of the absorbency for a water-based ink, it is preferable to use a resin containing a water-soluble cellulosic polymer such as hydroxypropyl cellulose, hydroxyethyl cellulose, methyl cellulose, and carboxymethyl cellulose. Besides, there may be mentioned also polyvinylpyrrolidone, polyvinyl alcohol, polyvinylacetal, polyurethane, and polyesters; and natural resins such as albumin, gelatin, casein, starch, cationic starch, gum arabic, and sodium alginate. In particular, in consideration of the aforementioned transparency and bleeding of colored portions, and light fastness of dyes in addition to the heat resistance and ink absorbency, preferred are mixtures of hydroxypropyl cellulose and a methylol-melamine resin, or polymers containing a homopolymer having the structural unit (XIX):

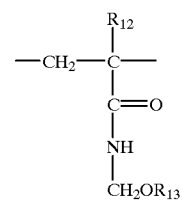

(XIX)

wherein $R_{12}$ is H or $CH_3$, $R_{13}$ is H or a linear or branched alkyl group which may be substituted by an alkyl having 1 to 5 carbon atoms; and/or a copolymer thereof with another vinyl monomer. Examples of the monomer corresponding to the above structural unit (XIX) include specifically N-methylolacrylamide, N-methoxymethylacrylamide, N-ethoxymethylacrylamide, N-isopropoxymethylacrylamide, N-methylolmethacrylamide, N-methoxymethylmethacrylamide and N-ethoxymethylmethacrylamide. Examples of the other vinyl monomer include acrylic acid, methacrylic acid, acrylates such as methyl acrylate and ethyl acrylate; methacrylates such as methyl methacrylate, ethyl methacrylate; hydroxyl group-containing vinyl monomers such as hydroxymethyl methacrylate, hydroxyethyl methacrylate, hydroxymethyl acrylate and hydroxyethyl acrylate; styrene, α-methylstyrene, acrylamide, methacrylamide, acrylonitrile, allylamine, vinylamine, vinyl acetate, and vinyl propionate. The copolymerization molar ratio of the monomer corresponding to the general formula (XIX) to the other vinyl monomer ranges preferably from 95:5 to 5:95.

The aforementioned ink-receiving layer 3 may contain additives, as needed. Examples of the additive include surfactants, dye-fixing agents (waterproofing agents), antifoaming agents, antioxidants, fluorescent whitening agents, UV absorbing agents, dispersants, viscosity-controlling agents, pH-controlling agents, mildew-proofing agents, and plasticizers. The additives may be selected arbitrarily from known compounds to meet the purpose.

The ink-receiving layer 3 can be formed by any of coating methods such as spin coating, roll coating, bar coating, spray coating, dip coating and the like. The layer may be prebaked, if necessary.

Figure 1C:
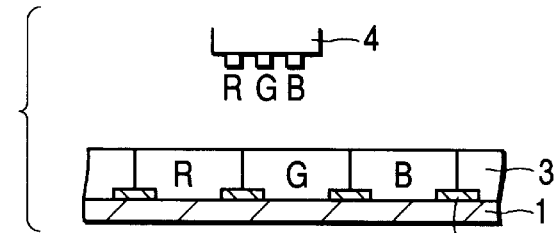
Figure 2:
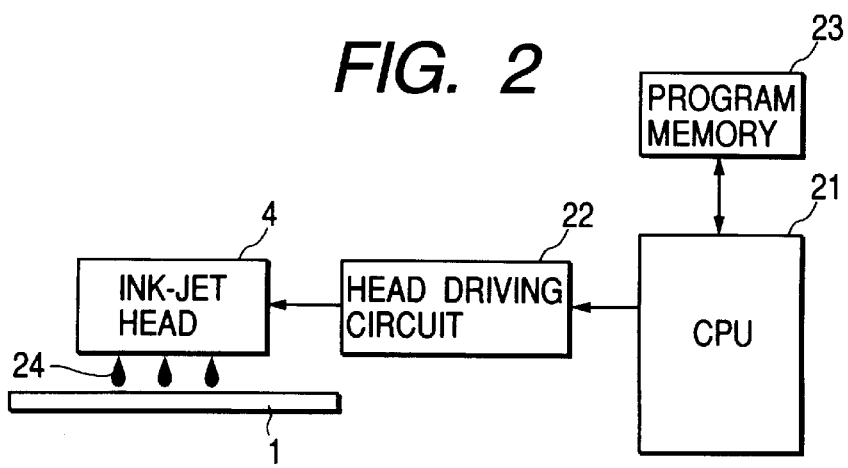
FIG. 2 illustrates a block diagram showing a constitution of an apparatus for forming pixels of a color filter by an ink-jet system.

In the next step, the aforementioned ink of the present invention is deposited on image formation portions by an ink-jet system to dye prescribed portions of the ink-receiving layer 3 (FIG. 1C). Reference numeral 4 denotes an ink-jet head comprising nozzles for R, G and B inks. The ink-jet system may be of a bubble jet type employing an electrothermal transducer as an energy-generating element, or of a piezo jet type employing a piezo element. The colored area and the colored pattern may be selected as desired. A preferable method for forming pixels by an ink-jet system is described below by reference to FIG. 2. FIG. 2 is a block diagram showing an apparatus for forming colored portions of a color filter. In FIG. 2, a CPU 21 is connected through a head driving circuit 22 to an ink-jet head 4. The CPU 21 is so constituted that control program information in a program memory 23 is introduced. The CPU 21 drives an ink-jet recording head 4 to a prescribed pixel-forming position (not shown in the drawing) on the base plate 1 to bring the prescribed pixel position below the ink-jet head 4. An ink 24 of a prescribed color is ejected onto the position to color it. This operation is conducted throughout the desired pixel positions on the base plate 1 to produce a color filter.

In a case of preparing a color filter having pixels of red (R), green (G), and blue (B), any of conventional inks may be used for forming green and blue pixels. Pixels of R, G and B are respectively formed by dyeing prescribed portions of an ink-receiving layer 3, simultaneously or successively, using such conventional green and blue inks with the red ink of the present invention.

Figure 1D:
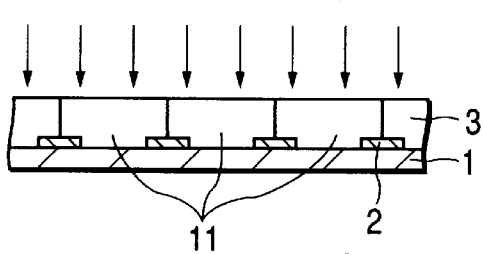

In the subsequent step, the ink-receiving layer 3 is cured (FIG. 1D). The curing treatment may be conducted by a method suitable for a curable resin used in the ink-receiving layer. For example, the ink-receiving layer is cured by heating or light irradiation or a combination of heating and light irradiation to form respective color pixels 11. The light irradiation intensity ranges preferably from about 1 to about 3,000 $mJ/cm^2$. The heat treatment can be conducted by means of an oven, a hot plate, or the like at a temperature ranging from 150° C. to 250° C. for a time ranging from 1 minute to 120 minutes.

Figure 1E:
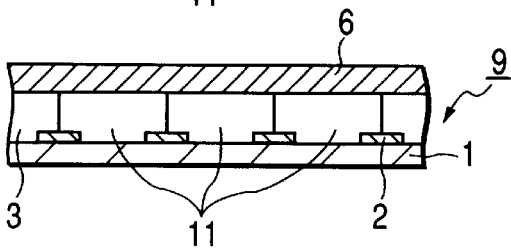

Further, a protection layer 6 is formed on the cured ink-receiving layer 3 as necessary (FIG. 1E). The protection layer 6 can be formed by applying a resin material, which is curable by light irradiation or a heat treatment, and curing subsequently, or by vapor-depositing an inorganic film or sputtering. As to the material of the protection layer, there are suitably used materials which do not impair the transparency required for the color filter when they are made into a protection layer and are capable of withstanding the later process such as an ITO formation process or an orientation film formation process. Examples of the material include acrylic resins such as epoxy acrylates, urethane acrylates and the like as an organic material; and $SiO_2$ and the like as an inorganic material.

In such a manner, the color filter 9 of FIG. 1E of this embodiment can be prepared.

[Second Embodiment]

A second embodiment of the color filter of the present invention is described below. This embodiment is different from the first embodiment in the point that portions corresponding to a black matrix 2 on an ink-receiving layer 3 are cured prior to application of an ink to an ink-receiving layer 3 to lower the ink absorbency in advance. This embodiment is explained along with the steps in the production process by reference to FIGS. 4A to 4F.

Figure 4A:
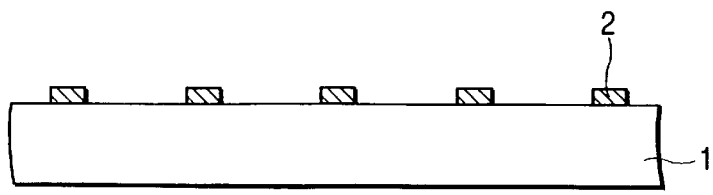
FIGS. 4A, 4B, 4C, 4D, 4E and 4F illustrate a flow chart of the process for producing a color filter of another embodiment of the present invention.
Figure 4B:
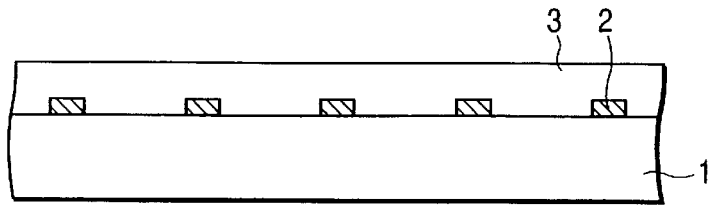

First, a base plate 1 is provided which has a black matrix 2 formed on the surface thereof, in the same manner as in the first embodiment (FIG. 4A). Thereon, an ink-receiving layer 3 is formed so as to cover the black matrix 2 (FIG. 4B). It is preferable to use a material for the ink-receiving layer 3 which lowers its ink absorbency at the surface by light irradiation.

As to the material for constituting the ink-receiving layer 3 in this embodiment, there can be suitably used materials in which a photopolymerization initiator is additionally incorporated into the aforementioned materials for the ink-receiving layer 3 of the first embodiment. Examples of the photopolymerization initiator include onium salts and halogenated triazine compounds. The onium salts are specifically exemplified by triphenylsulfonium hexafluoroantimonate, triphenylsulfonium tetrafluoroborate, triphenylsulfonium hexafluorophosphate, triphenylsulfonium trifluoromethylsulfonate, and derivatives thereof; and diphenyliodonium hexafluoroantimonate, diphenyliodonium tetrafluoroborate, diphenyliodonium hexafluorophosphate, diphenyliodonium trifluoromethylsulfonate, and derivatives thereof. Of these, halogenated triazine compounds and derivatives thereof are preferred. The amount of the photopolymerization initiator to be incorporated in the ink-receiving layer material ranges from 0.01 to 20% by weight, preferably from 0.1 to 10% by weight. There may be added thereto compounds such as perylene, anthracene and the like as a sensitizer.

Figure 4C:
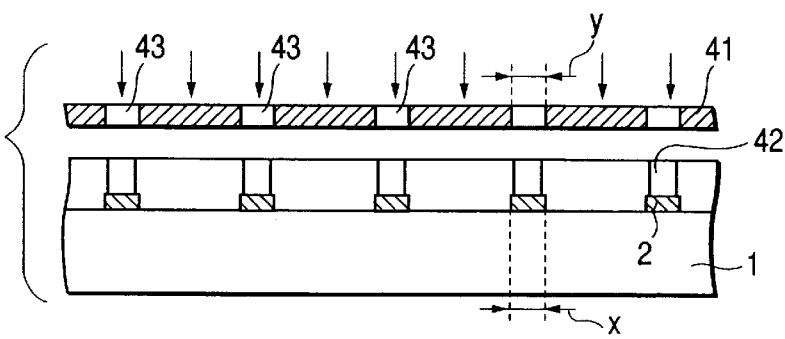
Figure 4D:
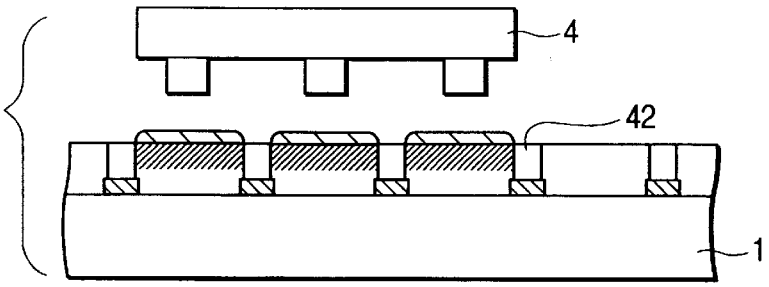
Figure 4E:
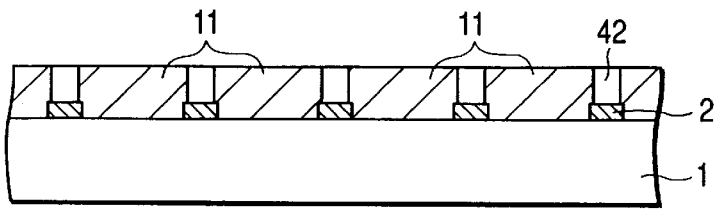
Figure 4F:
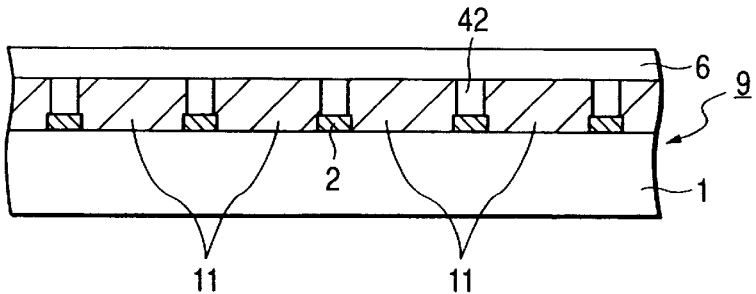

In the subsequent step, the portion corresponding to the black matrix 2 of the ink-receiving layer 3 is cured by selective exposure to light, for example, by use of a photo mask 41 (FIG. 4C). Thereby, a portion having less ink-absorbency (portion not to be colored) 42 is formed selectively on the ink-receiving layer 3. The photo mask 41 for the light pattern exposure has openings 43 for selective light irradiation of the portions of the ink-receiving layer corresponding to the black matrix 2. The width (y) of the openings 43 is preferably smaller than the width (x) of the black matrix 2. In the formation of a color filter by this method, slightly excess amount of the ink is applied to the region where pixels of the ink receiving layer are formed, for the sake of preventing undesirable occurrence of coloring failure on the borders between the black matrix 2 and the pixels. Therefore, the width of the portion not to be colored of the ink-receiving layer 3 is preferably made smaller than the width (x) of the black matrix 2. Thus the portions not to be colored can be formed by the use of the black photo mask 41 having the width (y) of the openings 43 smaller than the width (x) of the black matrix 2. The light of irradiation onto the ink-absorption layer for formation of non-colored portions 43 is not specially limited, but the intensity thereof is preferably in the range of from about 1 to about 3,000 $mJ/cm^2$. The heat treatment can be conducted at a temperature ranging from 150° C. to 250° C. for 1 minute to 120 minutes by means of an oven, a hot plate or the like.

Subsequent steps (FIGS. 4D to 4F) are conducted by applying the ink onto portions where pixels are to be formed by means of an ink-jet method and curing the ink-receiving layer 3 in the same manner as shown in FIGS. 1C to 1E, thereby producing a color filter.

The method of this Embodiment prevents troubles caused by color mixing and color irregularity at the border between pixels, in particular between adjacent pixels, in formation of R, G and B pixels by an ink-jet system, and enables production of high-quality color filters at a low production cost.

[Third Embodiment]

A third embodiment of the present invention is described below along the production steps by reference to FIGS. 5A to 5D. This embodiment has one feature in the point that the color filter is prepared without providing an ink-receiving layer 3.

First, a base plate 1 is provided which has a black matrix 2 formed on the surface thereof (FIG. 5A), in the same manner as in the first embodiment. In this embodiment, walls of a prescribed thickness (e.g., 0.5 μm or more) are preferably formed between the pixels. Preferably therefor, a black resin resist is patterned to form a black matrix 2.

Figure 5A:
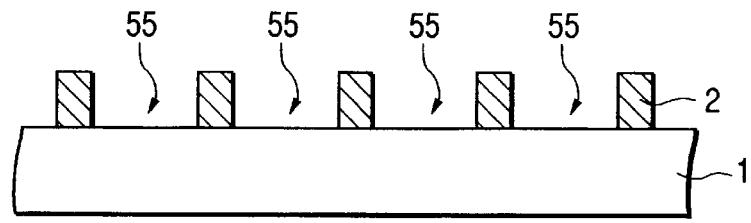
FIGS. 5A, 5B, 5C and 5D illustrate a flow chart of the process for producing a color filter of still another embodiment of the present invention.
Figure 5B:
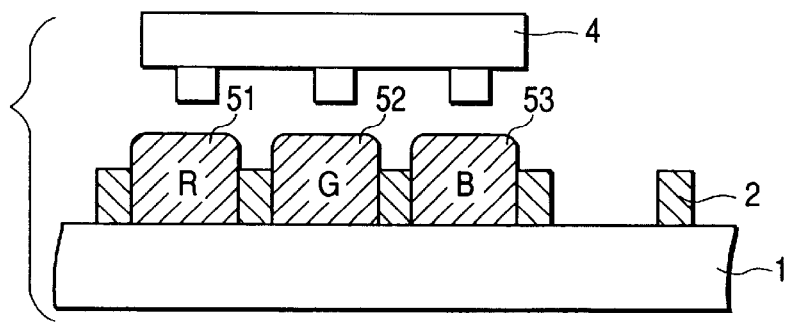

Then, as shown in FIG. 5B, the aforementioned red ink 51 of the present invention, a conventional G ink 52 and a conventional B ink 53 are applied to fill light-transmissive portions 55 between the black matrices 2 by utilizing an ink-jet system. In this operation, preferably the inks are applied so as not to cause overlap of the different color inks on black matrix 2.

(Ink composition)

The R ink for forming red pixels employed in this embodiment may be the aforementioned ink containing a metal complex azopyrazolone dye and a xanthene dye. However, it is in particular preferable to use an R ink comprising a resin which is curable by energy application such as light irradiation or heating or a combination of light irradiation and heating. The G ink and the B ink preferably also each contain the above resin.

(Curable resin component in the ink, and its content)

As to the aforementioned resin there may be used various commercially available resins or hardeners. However, it is preferable to use one which does not cause troubles such as solidification and the like before use. Examples of the resins include acrylic resins, epoxy resins and melamine resins. The component curable by light, heat or both light and heat is contained in the ink in an amount, for example, ranging from 0.1 to 20% by weight based on the total weight of the ink.

Figure 5C:
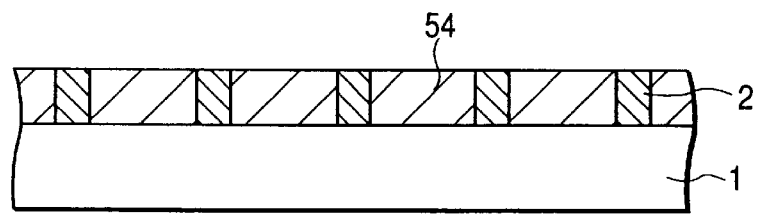
Figure 5D:
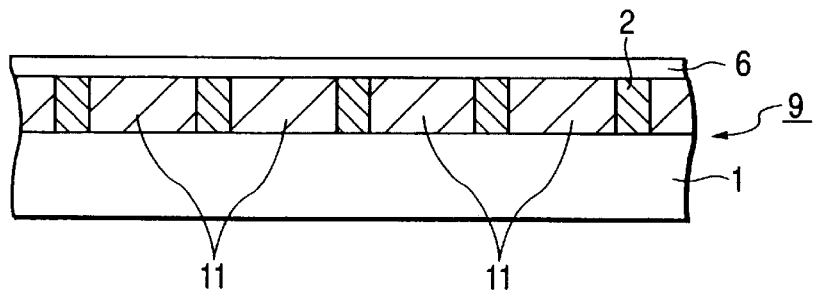

In the subsequent step, the inks applied to the openings 55 of FIG. 5A on the base plate 1 are partially cured by light irradiation, heating or both light irradiation and heating, as shown in FIG. 5C. Then, a curable resin composition is applied so as to cover both the black matrix 2 and colored portions 54 formed by the color inks, as shown in FIG. 5D. The coated matter is subjected to light irradiation and/or heating treatment to cure the colored portions 54 to complete colored pixels 11 and to cure the curable resin composition to form simultaneously a protection layer 6, thereby obtaining a color filter 9. The protection layer 6 can be formed as above by curing a curable resin by light irradiation, heat treatment or a combination of light irradiation and heat treatment. Otherwise, the protection layer 6 may be formed from an inorganic film by vapor deposition or sputtering. The material of the protection film 6 is preferably transparent as a color filter, and is capable of withstanding the subsequent steps such as ITO formation, orientation film formation and the like.

(Liquid crystal panel)

Figure 6:
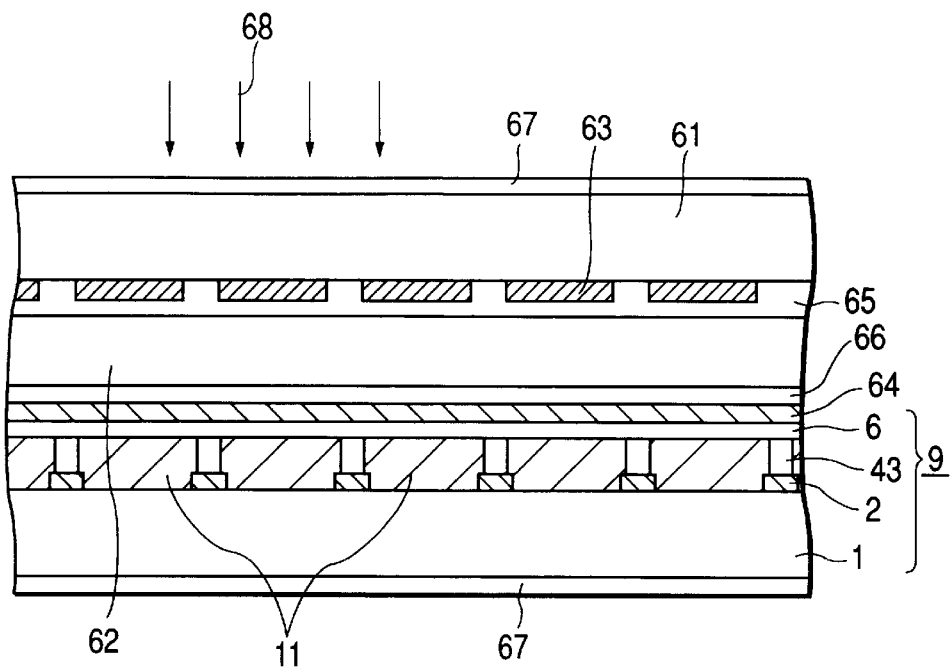
FIG. 6 is a schematic sectional view of a liquid crystal panel of an embodiment of the present invention.
Figure 7:
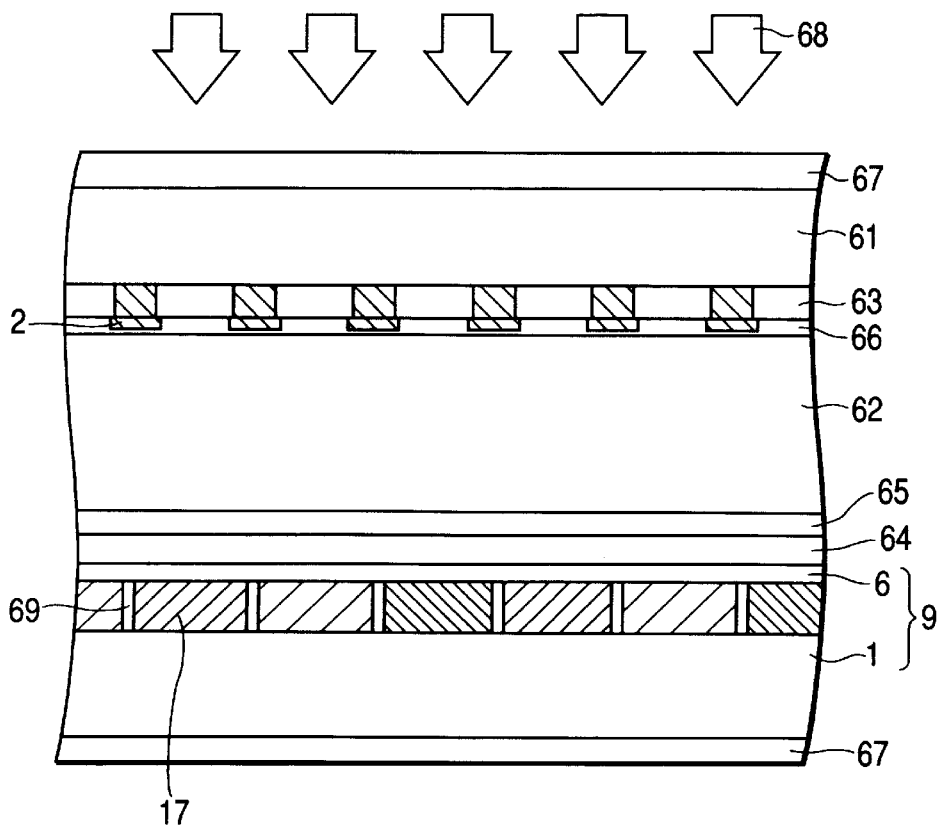
FIG. 7 is a schematic sectional view of a liquid crystal panel of another embodiment of the present invention.
Figure 8:
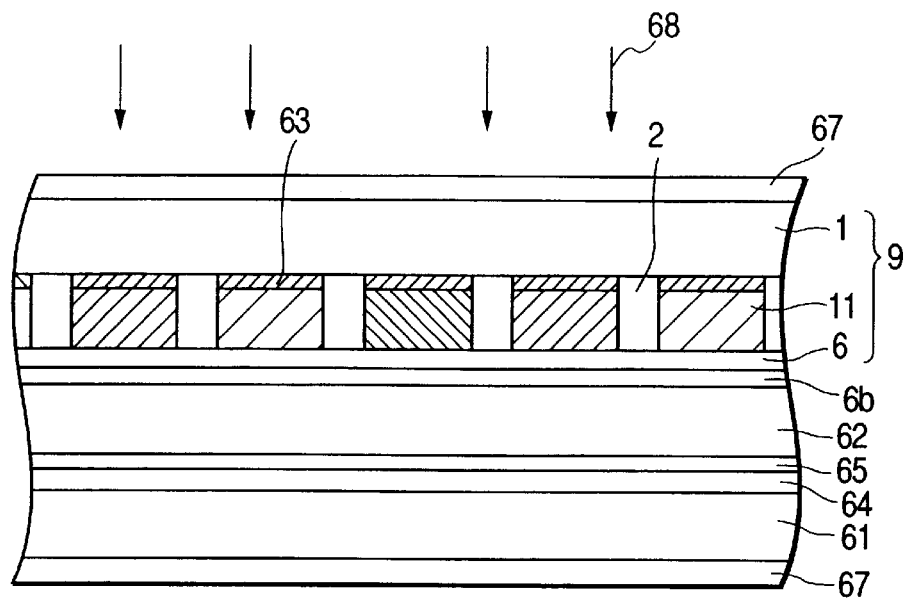
FIG. 8 is a schematic sectional view of a liquid crystal panel of still another embodiment of the present invention.

The color filter 9 formed in the respective embodiments above is used for constituting a liquid crystal panel. For example, a color filter 9 and a base plate 61 are placed in opposition as shown in FIG. 6, and a liquid crystal composition 62 is charged therebetween to form a liquid crystal panel. FIG. 6 is a sectional view of a TFT color liquid crystal panel having a color filter of the present invention. Thus, a color liquid crystal panel is formed by putting together the color filter 9 and the base plate 61 in opposition and filling the liquid crystal composition 62 therebetween. On the inside face of one of the base plates of the liquid crystal panel, there are formed a TFT (not shown in the drawing) and transparent pixel electrodes 63 in a matrix state. A counter (common) electrode 64 is formed on the entire face of a protection layer 6 of the color filter 9. An orientation film 65 is formed on the inside face of the counter base plate 61 so as to cover the pixel electrodes 63. Another orientation film 66 is also formed on the inside face of the counter base plate 64. The orientation films after rubbing treatment can align the liquid crystal molecules in one direction. For use of the liquid crystal panel prepared as above for a display device, polarizing plates 67 are bonded outside the color filter base plate 1 and the counter base plate 61. The liquid crystal panel conducts display by utilizing the liquid crystal as a light shutter for changing the transmittance of light 68 from a back light source which is generally a combination of a fluorescent lamp and a light-scattering plate. The black matrix 2 and the colored portions 11 are usually formed on the color filter base plate side as shown in FIG. 6. However, in a liquid crystal panel of a black matrix (BM) of an on-array type, the BM is formed on the TFT base plate side reverse to the BM as shown in FIG. 7. In a liquid crystal panel of the color filter (CF) of the on-array type, the CF is formed on the TFT base plate side in opposition to the BM as shown in FIG. 8. Reference numerals in FIGS. 7 and 8 have the same meaning as in FIG. 6. Reference numeral 43 in FIG. 6 denotes a portion having less ink absorbency, and reference numerals 17 and 69 in FIG. 7 denote a colored pixel and a black matrix, respectively.

Figure 9:
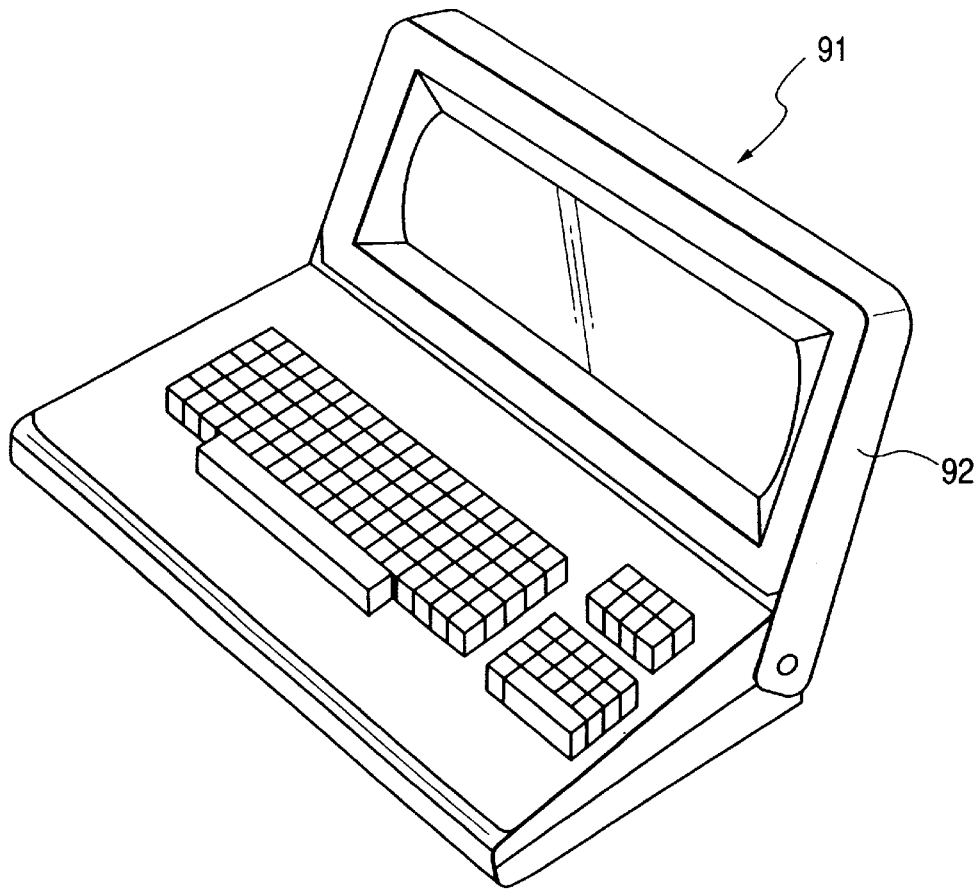
FIG. 9 is a schematic perspective view of a computer of an embodiment of the present invention.

The liquid crystal panel prepared in such a process can be used as an image display device 92 of a computer 91 or the like as shown in FIG. 9.

The embodiments of the present invention are described below more specifically.

Examples A1 to A15

A glass base plate was provided which had a black matrix made of chromium having openings in a size ranging from 60 to 150 μm. On this glass base plate, a curable resin composition composed of a copolymer of N-methylolacrylamide and hydroxyethyl methacrylate in a ratio of 50:50 by weight was applied in a film thickness of 1.2 μm by spin coating, and prebaked at 120° C. for 20 minutes to form an ink-receiving layer.

Fifteen kinds of R Inks A1 to A15 were prepared by using a combination of a metal complex azopyrazolone dye and a xanthene dye as the coloring material in accordance with Formulation 1 for R Ink below as shown in Table 2.

Blue (B) Ink was prepared by using C.I. Acid Blue 83 as the blue dye, and Green (G) Ink was prepared by using C.I. Acid Green 9 as the green dye in accordance with Formulation 1 for G and B Inks as below.

The R Ink A1, the G Ink and the B Ink were applied to portions where pixels of the respective colors were to be formed by an ink-jet printer to color the matrix pattern in R, B and G. The colored matter was then subjected to a baking treatment at 230° C. for 50 minutes to cure the applied inks. After drying, a two-pack type acrylic thermosetting resin material (SS-7625, trade name, produced by Japan Synthetic Rubber Co.) was applied thereto in a thickness of 1 μm by spin coating. The coated matter was heat treated at 240° C. for 20 minutes to cure the resin. Thus, the color filter for a liquid crystal display device of Example A1 was prepared.

Separately, color filters for a liquid crystal display device of Examples A2 to A15 were prepared respectively in the same manner as above except that R Ink A1 was changed to R Inks A2 to A15, respectively.

The color filters of Examples A1 to A15 for a liquid crystal display device were evaluated. The R Inks A1 to A15 were evaluated for ink-jet ejection stability. The evaluation standards and the evaluation results are shown below.

TABLE 2

| R Ink | Metal complex azopyrazolone dye (General Formula (I))* | | | | | | Xanthene dye |
|---|---|---|---|---|---|---|---|
| | R1 | R2 | R3 | R4 | R5 | R6 | |
| A1 | SO$_3$Na | NO$_2$ | SO$_3$Na | H | H | H | C.I. Acid Red 289 |
| A2 | SO$_3$Na | NO$_2$ | SO$_3$Na | NO$_2$ | H | H | C.I. Acid Red 289 |
| A3 | SO$_3$Na | Cl | SO$_3$Na | H | H | H | C.I. Acid Red 289 |
| A4 | SO$_3$Na | Cl | SO$_3$Na | Cl | H | H | C.I. Acid Red 289 |
| A5 | SO$_3$Na | H | SO$_3$Na | H | H | H | C.I. Acid Red 289 |
| A6 | SO$_3$Na | CH$_3$ | SO$_3$Na | CH$_3$ | H | H | C.I. Acid Red 289 |
| A7 | SO$_3$Na | CH$_3$ | SO$_3$Na | H | H | H | C.I. Acid Red 289 |
| A8 | SO$_3$Na | CH$_3$ | SO$_3$Na | CH$_3$ | H | H | C.I. Acid Red 289 |
| A9 | SO$_3$Na | NO$_2$ | SO$_3$Na | H | SO$_3$Na | H | C.I. Acid Red 92 |
| A10 | SO$_3$Na | NO$_2$ | SO$_3$Na | H | SO$_3$Na | SO$_3$Na | C.I. Acid Red 92 |
| A11 | SO$_3$Na | NO$_2$ | SO$_3$Na | H | Cl | H | C.I. Acid Red 92 |
| A12 | SO$_3$Na | NO$_2$ | SO$_3$Na | H | SO$_3$Na | Cl | C.I. Acid Red 289 |
| A13 | SO$_3$Na | NO$_2$ | H | H | H | H | C.I. Acid Red 289 |
| A14 | SO$_3$Na | NO$_2$ | Cl | H | H | H | C.I. Acid Red 289 |
| A15 | SO$_3$Na | NO$_2$ | H | H | SO$_3$Na | H | C.I. Acid Red 289 |

*In General Formula (I), X1 is Na and M3 is chromium (Cr).

| Ink Formulation 1 for R Ink | |
|---|---|
| Metal complex azopyrazolone dye: | 4.7% by weight |
| Xanthene dye: | 1.0% by weight |
| Ethylene glycol monobutyl ether (bp 170° C.): | 39.0% by weight |
| Ethyl alcohol (bp 78° C.): | 6.0% by weight |
| Water | 49.3% by weight |

| Ink Formulation 1 for G and B Inks | |
|---|---|
| Dye: | 5.7% by weight |
| Ethylene glycol monobutyl ether (bp 170° C.): | 39.0% by weight |
| Ethyl alcohol (bp 78° C.): | 6.0% by weight |
| Water | 49.3% by weight |

Evaluation Method
Evaluation 1: Transparency of colored portion

A liquid crystal panel was prepared with the above color filter. The transparency of the R pattern portions was evaluated visually on three evaluation grades:

A: Transparency being excellent;

B: Transparency being slightly lower; and

C: Cloudy in comparison with A and B Evaluation 2: Bleeding of colored portions

The color filter was left standing at 60° C. for 48 hours. The degree of bleeding (increase of the color portion area) of the R pattern was evaluated. The bleeding of the R pattern portions was evaluated on three evaluation grades:

A: Less than 5%;

B: 5% or higher, but not more than 10%; and

C: 10% or higher. Evaluation 3: Adhesiveness of colored portion to base plate

The color filter was subjected to a pressure cooker treatment under conditions of temperature of 125° C. and humidity of 85% for 6 hours. After the treatment, the state of the R pattern portions was observed by microscopy. The adhesiveness of the R pattern portions was evaluated on three evaluation grades:

A: No problem;

B: Wrinkles formed; and

C: Colored portions separated from base plate. Evaluation 4: Ejection stability of R Ink R Ink was set to a printer, BJ-10 (trade name, a product of Canon Inc.), and a character pattern was printed on 300 paper sheets of A4 size. The 300th printed paper sheet was examined visually. The ejection stability of the R Ink was evaluated on three evaluation grades:

A: No problem,

B: Slight blur observed, and

C: Ink ejection failed. Evaluation 5: Light fastness

The color filter was exposed to xenon light for 50 hours by means of Fade-o-Meter Model Ci35, (trade name, manufactured by Atlas Co.). Then the degree of discoloration of R pattern portions was calculated as ΔE (color difference) according to CIE. The light fastness of the R pattern portions was evaluated on three grades:

A: ΔE being 10 or lower,

B: ΔE being higher than 10, but 20 or lower, and

C: ΔE being higher than 20.

Evaluation results are shown in Table 3.

TABLE 3

| Example | Evaluation item | | | | |
|---|---|---|---|---|---|
| | 1 | 2 | 3 | 4 | 5 |
| A1 | A | A | A | A | A |
| A2 | A | A | A | A | A |
| A3 | A | A | A | A | A |
| A4 | A | A | A | A | A |
| A5 | A | A | A | A | A |
| A6 | A | A | A | A | A |
| A7 | A | A | A | A | A |
| A8 | A | A | A | A | A |
| A9 | A | A | A | A | A |
| A10 | A | A | A | A | A |
| A11 | A | A | A | A | A |
| A12 | A | A | A | A | A |
| A13 | A | A | A | B | A |
| A14 | A | A | A | B | A |
| A15 | A | B | A | A | A |

Example A16

A color filter was prepared and evaluated in the same manner as in Example A1 except that the concentrations of the metal complex azopyrazolone dye and the xanthene dye were changed to 2.5% and 3.0% by weight, respectively. Evaluation results are shown in Table 4.

Example A17

A color filter was prepared and evaluated in the same manner as in Example A1 except that the concentrations of the metal complex azopyrazolone dye and the xanthene dye were changed to 3.0% and 2.5% by weight, respectively. Evaluation results are shown in Table 4.

Example A18

A color filter was prepared and evaluated in the same manner as in Example A1 except that the metal complex dye, in which the center metal (M3) was changed to nickel (Ni) from chromium (Cr), was used. Evaluation results are shown in Table 4.

Comparative Example A5

A color filter was prepared and evaluated in the same manner as in Example A1 except that, as the dye, only the metal complex azopyrazolone dye in Example A5 was used. Evaluation results are shown in Table 4.

Comparative Example A6

A color filter was prepared and evaluated in the same manner as in Example A1 except that, as the dye, only the xanthene dye in Example A6 was used. Evaluation results are shown in Table 4.

TABLE 4

| | Evaluation item | | | | |
|---|---|---|---|---|---|
| | 1 | 2 | 3 | 4 | 5 |
| Example | | | | | |
| A16 | A | A | B | A | B |
| A17 | A | A | B | B | B |
| A18 | A | A | A | A | A |
| Comparative Example | | | | | |
| A5 | B | C | B | A | A |
| A6 | A | A | B | B | C |

Examples B1 to B15

Color filters of Examples B1 to B15 for a liquid crystal were produced in the same manner as in Examples A1 to A15 except that the R Ink was prepared according to Ink Formulation 2 for R Ink and the G Ink and the B Ink were prepared with changes of the ratios of the metal complex azopyrazolone dye to the xanthene dye and the solvent according to Ink Formulation 2 for G and B Inks below. The R Inks and the color filters were evaluated in the same manner as in Examples A1 to A15. Evaluation results are shown in Table 5.

| Ink Formulation 2 for R Ink: | |
|---|---|
| Metal complex azopyrazolone dye | 4.8% by weight |
| Xanthene dye | 0.7% by weight |
| Formamide (bp 211° C.) | 15.0% by weight |
| Dipropylene glycol monomethyl ether (bp 190° C.) | 19.0% by weight |
| Isopropyl alcohol (bp 82° C.) | 2.0% by weight |
| Water | 58.5% by weight |
| Ink Formulation 2 for G and B Inks: | |
| Dye | 5.5% by weight |
| Formamide (bp 211° C.) | 15.0% by weight |
| Dipropylene glycol monomethyl ether (bp 190° C.) | 19.0% by weight |
| Isopropyl alcohol (bp 82° C.) | 2.0% by weight |
| Water | 58.5% by weight |

TABLE 5

| | Evaluation item | | | | |
|---|---|---|---|---|---|
| Example | 1 | 2 | 3 | 4 | 5 |
| B1 | A | A | A | A | A |
| B2 | A | A | A | A | A |
| B3 | A | A | A | A | A |
| B4 | A | A | A | A | A |
| B5 | A | A | A | A | A |
| B6 | A | A | A | A | A |
| B7 | A | A | A | A | A |
| B8 | A | A | A | A | A |
| B9 | A | A | A | A | A |
| B10 | A | A | A | A | A |
| B11 | A | A | A | A | A |
| B12 | A | A | A | A | A |
| B13 | A | A | A | B | A |
| B14 | A | A | A | B | A |
| B15 | A | B | B | A | B |

Examples C1 to C15

On a glass base plate, a black matrix of 1.0 μm thick was formed by applying a photosensitive resin containing a black pigment (Black Pigment Resist CK-S171B, trade name, produced by Fuji Hunt Co.) by spin coating, and subjecting the resin to pattern light exposure, development and heat treatments. Into the predetermined openings of the black matrix, R Ink, G Ink and B Ink were respectively ejected by an ink-jet printer. The inks were cured by heat treatment at 230° C. for 30 minutes to form a color filter for a liquid crystal element. The compositions of the inks are shown below as Ink Formulation 3 for R Ink, and Ink Formulation 3 for B and G Inks. Fifteen kinds of R Inks employed and fifteen kinds of color filters for a liquid crystal element were evaluated as below. Evaluation results are shown in Table 6.
Coloring matter for R Ink:
Dye combinations respectively corresponding to those of A1 to A15 in Table 2

| Coloring matter for B ink: | C.I. Acid Red 83 |
|---|---|
| Coloring matter for G ink: | C.I. Acid Red 9 |
| Ink Formulation 3 for R Ink: | |
| Metal complex azopyrazolone dye: | 4.7% by weight |
| Xanthene dye: | 1.0% by weight |
| Acrylic copolymer from monomers below: | 3% by weight |
|   N-Methylolacrylamide | 20 parts by weight |
|   N,N-Dimethylaminoethyl methacrylate | 10 parts by weight |
|   Methyl methacrylate | 25 parts by weight |
|   2-Hydroxyethyl methacrylate | 40 parts by weight |
|   Acrylic acid | 5 parts by weight |
| Ethylene glycol monobutyl ether (bp 170° C.): | 36.0% by weight |
| Ethyl alcohol (bp 78° C.): | 6.0% by weight |
| Water | 49.3% by weight |
| Ink Formulation 3 for G and B Inks: | |
| Dye: | 5.7% by weight |
| Acrylic copolymer from monomers below: | 3% by weight |
|   N-Methylolacrylamide | 20 parts by weight |
|   N,N-Dimethylaminoethyl methacrylate | 10 parts by weight |
|   Methyl methacrylate | 25 parts by weight |
|   2-hydroxyethyl methacrylate | 40 parts by weight |
|   Acrylic acid | 5 parts by weight |
| Ethylene glycol monobutyl ether (bp 170° C.): | 36.0% by weight |
| Ethyl alcohol (bp 78° C.): | 6.0% by weight |
| Water | 49.3% by weight |

Evaluation methods
  Evaluation 1: Transparency of colored portion
    Liquid crystal panels were prepared with the above color filters. The transparency of the R pattern portions was evaluated visually on three grades:

A: Transparency being excellent,
B: Transparency being slightly lower, and
C: Cloudy in comparison with A and B.

Evaluation 2: Uniformity of colored portions

The color filters were examined by microscopy. The uniformity of the R pattern portions was evaluated on three grades:

A: Uniform,
B: Some white blank portions observed, and
C: Entirely white blank occurred.

Evaluation 3: Adhesiveness of colored portion to base plate

The color filter was subjected to a pressure cooker treatment under the conditions of 125° C. and 85% for 6 hours. After the treatment, the state of the R pattern portions was observed by microscopy. The adhesiveness of the R pattern portions was evaluated on three grades:

A: No problem,
B: Wrinkles observed, and
C: Colored portions separated from base plate.

Evaluation 4: Ejection stability of R Ink

The R Ink was set to a printer, BJ-10 (trade name, a product of Canon Inc.), and a character pattern was printed on 300 paper sheets of A4 size. The 300th printed paper sheet was examined visually. The ejection stability of the R Ink was evaluated on three grades:

A: No problem,
B: Slight blur observed, and
C: Ink ejection failed.

Evaluation 5: Light fastness

The color filter was exposed to xenon light for 50 hours by means of Fade-o-Meter Model Ci35 (trade name, manufactured by Atlas Co.). Then the degree of discoloration was represented by ΔE (color difference) according to CIE. The light fastness of the R pattern portions was evaluated on three grades:

A: ΔE being 10 or lower,
B: ΔE being higher than 10, but 20 or lower, and
C: ΔE being higher than 20.

Evaluation results are shown in Table 6.

TABLE 6

| Example | Evaluation item | | | | |
| --- | --- | --- | --- | --- | --- |
| | 1 | 2 | 3 | 4 | 5 |
| C1 | A | A | A | A | A |
| C2 | A | A | A | A | A |
| C3 | A | A | A | A | A |
| C4 | A | A | A | A | A |
| C5 | A | A | A | A | A |
| C6 | A | A | A | A | A |
| C7 | A | A | A | A | A |
| C8 | A | A | A | A | A |
| C9 | A | A | A | A | A |
| C10 | A | A | A | A | A |
| C11 | A | A | A | A | A |
| C12 | A | A | A | A | A |
| C13 | A | A | A | B | A |
| C14 | A | A | A | B | A |
| C15 | A | B | B | A | A |

What is claimed is:

1. An ink for ink-jet recording comprising a metal complex azopyrazolone dye and a xanthene dye.

2. The ink according to claim 1, wherein the metal complex azopyrazolone dye is a dye having a structure of the general formula (I):

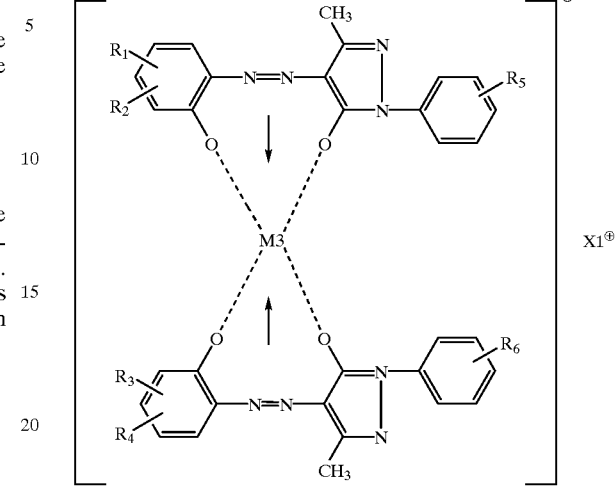

wherein $R_1$, $R_2$, $R_3$ and $R_4$ are each independently a hydrogen atom, a halogen atom, a nitro group, a linear or branched alkyl group having 1 to 5 carbon atoms, a $CF_3$ group, or an $SO_3(M1)$ group, where M1 is an alkali metal or $NH_4$; $R_5$ and $R_6$ are each independently a hydrogen atom, a halogen atom, or an $SO_3(M2)$ group, where M2 is an alkali metal or $NH_4$; M3 is Cr. Ni or Co; and $X1^+$ is an alkali metal cation or $NH_4^+$.

3. The ink according to claim 1, wherein the metal complex azopyrazolone dye is a dye having a structure of the general formula (II):

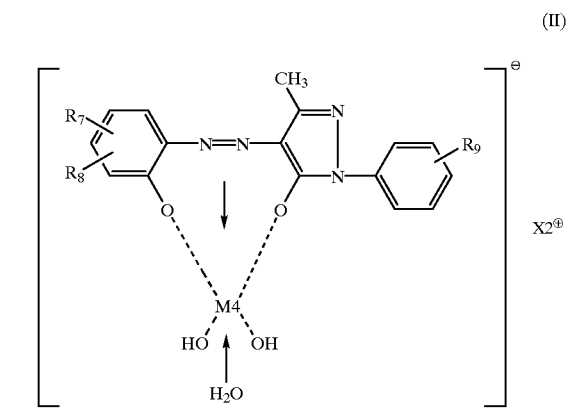

wherein $R_7$ and $R_8$ are each independently a hydrogen atom, a halogen atom, a nitro group, a linear or branched alkyl group having 1 to 5 carbon atoms, a $CF_3$ group, or an $SO_3(M1)$ group, where M1 is an alkali metal or $NH_4$; $R_9$ is a hydrogen atom, a halogen atom, or an $SO_3(M2)$ group, where M2 is an alkali metal or $NH_4$; M4 is Cu or Cr; and $X2^+$ is an alkali metal cation or $NH_4^+$.

4. The ink according to any one of claims 1, 2 or 3, wherein the xanthene dye is a dye having a structure of the general formula (III):

(III)

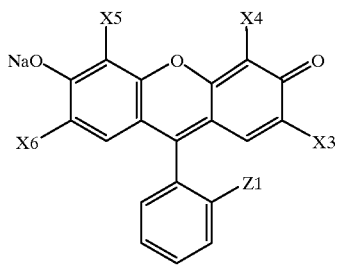

wherein $X_3$, $X_4$, $X_5$ and $X_6$ are each independently a halogen atom; and Z1 is a —COO(M5) group or an —SO$_3^-$ group, where M5 is an alkali metal or NH$_4$, or of the general formula (IV):

(IV)

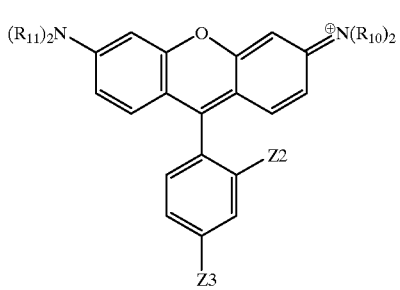

wherein $R_{10}$ and $R_{11}$ are each independently a hydrogen atom, a linear or branched alkyl group having 1 to 5 carbon atoms, a substituted or unsubstituted aryl group; and Z2 and Z3 are each independently a —COO(M6) group or an —SO$_3^-$ group, where M6 is an alkali metal or NH$_4^+$.

5. The ink according to claim 1, wherein the ink comprises the azopyrazolone dye and the xanthene dye in a proportion ranging from 50:1 to 1:2 by weight.

6. The ink according to claim 5, wherein the ink comprises the azopyrazolone dye and the xanthene dye in a proportion ranging from 20:1 to 1:1 by weight.

7. The ink according to claim 1, wherein the ink comprises the dyes at a total concentration ranging from 0.1 to 15% by weight based on the total weight of the ink.

8. The ink according to claim 1, wherein the ink comprises a solvent having a boiling point ranging from 150° C. to 250° C.

9. The ink according to claim 1, wherein the ink comprises additionally a curable resin.

10. The ink according to claim 9, wherein the curable resin is curable by at least one of light irradiation and heat application.

11. A color filter comprising a light transmissive base plate and a red color pixel at prescribed positions on the base plate, wherein the pixel comprises a metal complex azopyrazolone dye and a xanthene dye.

12. The color filter according to claim 11, wherein the base plate is provided with a resin layer on the surface thereof, and a part of the resin layer constitutes the pixel.

13. The color filter according to claim 11 or 12, wherein a plurality of the pixels are provided, the pixels are separated from each other and a light-shielding layer is provided between the respective pixels.

14. The color filter according to claim 13, wherein the light-shielding layer has a noncolorable surface.

15. The color filter according to claim 11, wherein a plurality of the pixels are provided; the pixels are separated from each other; a light-shielding layer and a resin layer which covers the light-shielding layer are provided between the colored pixels; and the surface of the resin layer on the light-shielding layer is noncolorable.

16. The color filter according to claim 11, wherein the metal complex azopyrazolone dye is a dye having a structure represented by the general formula (I):

(I)

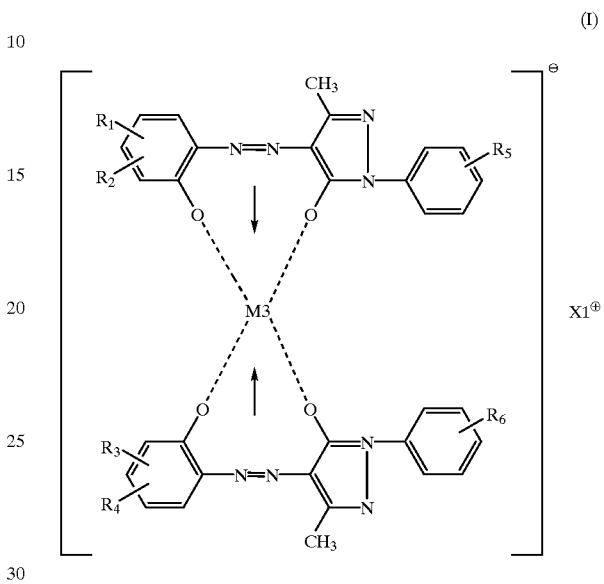

wherein $R_1$, $R_2$, $R_3$ and $R_4$ are each independently a hydrogen atom, a halogen atom, a nitro group, a linear or branched alkyl group having 1 to 5 carbon atoms, a CF$_3$ group, or an SO$_3$(M1) group, where M1 is an alkali metal or NH$_4$; $R_5$ and $R_6$ are each independently a hydrogen atom, a halogen atom or an SO$_3$(M2) group, where M2 is an alkali metal or NH$_4$; M3 is Cr, Ni or Co; and X1$^+$ is an alkali metal cation or NH$_4^+$.

17. The color filter according to claim 11, wherein the metal complex azopyrazolone dye is a dye having a structure of the general formula (II):

(II)

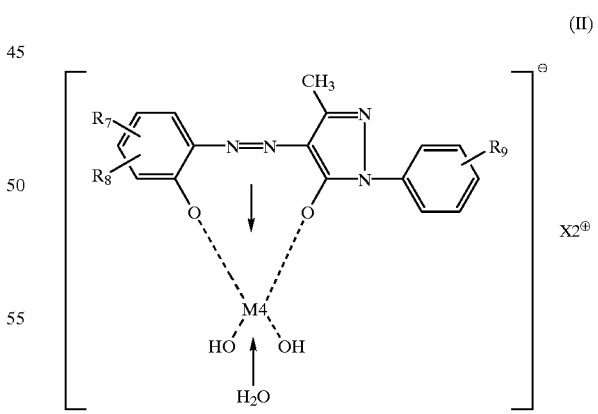

wherein $R_7$ and $R_8$ are each independently a hydrogen atom, a halogen atom, a nitro group, a linear or branched alkyl group having 1 to 5 carbon atoms, a CF$_3$ group or an SO$_3$(M1) group, where M1 is an alkali metal or NH$_4$; $R_9$ is a hydrogen atom, a halogen atom or an SO$_3$(M2) group, where M2 is an alkali metal or NH$_4$; M4 is Cu or Cr; and X2$^+$ is an alkali metal cation or NH$_4^+$.

18. The color filter according to claim 11, wherein the xanthene dye is a dye having a structure of the general formula (III):

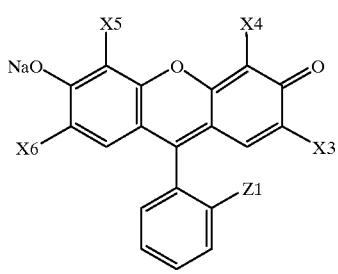

(III)

wherein $X_3$, $X_4$, $X_5$ and $X_6$ are each independently a halogen atom; and Z1 is a —COO(M5) group or an —SO$_3^-$ group, where M5 is an alkali metal or NH$_4$, or of the general formula (IV):

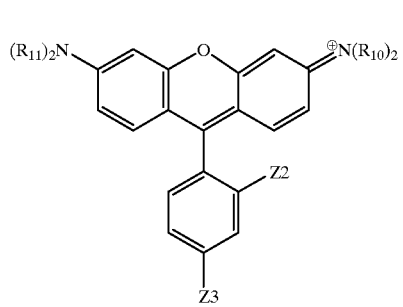

(IV)

wherein $R_{10}$ and $R_{11}$ are each independently a hydrogen atom, a linear or branched alkyl group having 1 to 5 carbon atoms, a substituted or unsubstituted aryl group; and Z2 and Z3 are each independently a —COO(M6) group or an —SO$_3^-$ group, where M6 is an alkali metal or NH$_4^+$.

19. The color filter according to claim 11, wherein the ink comprises the azopyrazolone dye and the xanthene dye in a proportion ranging from 50:1 to 1:2.

20. The color filter according to claim 19, wherein the ink comprises the azopyrazolone dye and the xanthene dye in a proportion ranging from 20:1 to 1:1.

21. A liquid crystal panel comprising:
a color filter set forth in claim 11, and
a panel base plate placed in opposition to the color filter, wherein a liquid crystal compound is enclosed between the color filter and the panel base plate.

22. The liquid crystal panel according to claim 21, wherein an electrode for controlling an orientation of the liquid crystal compound is provided on a reverse side surface of a light-transmissive base plate of the color filter, to a surface where colored pixels exist.

23. A computer provided with the liquid crystal panel set forth in claim 21 as an image display device.

24. A process for producing a color filter comprising the step of:
ejecting an ink set forth in claim 1 onto a light-transmissive base plate by an ink-jet system to deposit the ink on prescribed positions, thereby forming colored pixels.

25. The process for producing a color filter according to claim 24, wherein the light-transmissive base plate has a resin layer on the surface thereof.

26. The process for producing a color filter according to claim 25, wherein a material for forming the resin layer is a polymer comprising a water-soluble acrylic monomer unit.

27. The process for producing a color filter according to claim 25, wherein a material for forming the resin layer comprises a cellulosic water-soluble polymer.

28. A process for producing a color filter comprising the steps of:
ejecting an ink set forth in claim 9 onto a light-transmissive base plate by an ink-jet system to deposit the ink on a prescribed position on the surface of the base plate, and subsequently
curing a curable resin in the ink to form a color pixel.

29. The process for producing a color filter according to claim 24, wherein the light-transmissive base plate has a light-shielding layer which separates pixels formed on the surface of the base plate from each other.

30. The process for producing a color filter according to claim 24, wherein the light-transmissive base plate comprises a light-shielding layer, which separates pixels formed on the surface of the base plate from each other, and a resin layer covering the light-shielding layer, the resin layer on the light-shielding layer being noncolorable.

31. The process for producing a color filter according to claim 24, wherein the process further comprises the steps of:
forming a curable resin layer to cover the colored pixels, and
curing the curable resin.

32. The process for producing a color filter according to claim 31, wherein the curable resin is cured by application of at least one of light energy and heat energy.

* * * * *

UNITED STATES PATENT AND TRADEMARK OFFICE
CERTIFICATE OF CORRECTION

PATENT NO. : 6,203,604 B1
DATED : March 20, 2001
INVENTOR(S) : Akio Kashiwazaki et al.

It is certified that error appears in the above-identified patent and that said Letters Patent is hereby corrected as shown below:

Column 22,
Line 32, "Cr." should read -- Cr, --.

Column 23,
Line 14, "$X_3, X_4, X_5$ and $X_6$" should read --$x3, x4, x5$ and $x6$ --.

Column 25,
Line 17, "$X_3, X_4, X_5$ and $X_6$" should read --$x3, x4, x5$ and $x6$ --.

Signed and Sealed this

Fourth Day of December, 2001

Attest:

NICHOLAS P. GODICI
*Attesting Officer*      *Acting Director of the United States Patent and Trademark Office*